(12) United States Patent
Noda et al.

(10) Patent No.: US 7,011,708 B2
(45) Date of Patent: *Mar. 14, 2006

(54) HEAT TRANSFER DEVICE

(75) Inventors: Hideo Noda, Amagasaki (JP); Hiroshi Ooshima, Ikoma (JP); Takaya Inoue, Amagasaki (JP); Hiroaki Ueda, Amagasaki (JP)

(73) Assignee: Kansai Chemical Engineering Co. Ltd., (JP)

( * ) Notice: Subject to any disclaimer, the term of this patent is extended or adjusted under 35 U.S.C. 154(b) by 229 days.

This patent is subject to a terminal disclaimer.

(21) Appl. No.: 10/381,674

(22) PCT Filed: Sep. 17, 2001

(86) PCT No.: PCT/JP01/08070

§ 371 (c)(1),
(2), (4) Date: Mar. 27, 2003

(87) PCT Pub. No.: WO02/26374

PCT Pub. Date: Apr. 4, 2002

(65) Prior Publication Data

US 2003/0190271 A1    Oct. 9, 2003

(30) Foreign Application Priority Data

Sep. 28, 2000  (JP)  .............................. 2000-297215
Feb. 23, 2001  (JP)  ................................ 2001-47749

(51) Int. Cl.
*C30B 13/00* (2006.01)

(52) U.S. Cl. ...................... 117/200; 117/206; 117/900; 422/245.1; 422/258; 422/259; 23/301

(58) Field of Classification Search ............. 422/255.1, 422/258, 259; 117/200, 206, 900; 23/301
See application file for complete search history.

(56) References Cited

U.S. PATENT DOCUMENTS

| 6,241,954 B1 * | 6/2001 | Jansen et al. ............. 422/245.1 |
| 6,315,966 B1 * | 11/2001 | Baumgard et al. ........ 422/245.1 |
| 6,458,332 B1 * | 10/2002 | Ooshima et al. ............. 422/254 |
| 2002/0155047 A1 * | 10/2002 | Max ........................ 422/245.1 |

FOREIGN PATENT DOCUMENTS

| GB | 1238943 | 7/1971 |
| JP | 1238943 | 7/1971 |
| JP | 48-29628 | 9/1973 |
| JP | 60-39328 | 3/1985 |
| JP | 63-269976 | 11/1988 |
| JP | 8-126837 | 5/1996 |
| JP | 2000-513998 | 10/2000 |
| WO | WO 98/01204 | 1/1998 |

* cited by examiner

*Primary Examiner*—Robert Kunemund
(74) *Attorney, Agent, or Firm*—Jagtiani + Guttag

(57) ABSTRACT

A device includes an agitation tank, a liquid circulation means for circulating a liquid along a tank wall of the agitation tank, and at least one auxiliary heat transfer means provided inside the agitation tank, wherein the auxiliary heat transfer means is constantly put in a wetted state.

19 Claims, 14 Drawing Sheets

HEAT TRANSFER DEVICE

CROSS-REFERENCE TO RELATED APPLICATIONS

This is a national stage of PCT/JP01/08070, filed on Sep. 17, 2001, which claims the priority of Japanese Patent Application No. 2000-297215, filed on Sep. 28, 2000, and Japanese Patent Application No. 2001-47749, filed on Feb. 23, 2001. The entire contents and disclosures of which are hereby incorporated by reference.

1. Technical Field

The present invention relates to a heat transfer device. More specifically, the present invention relates to a heat transfer device with high heat transfer efficiency, in which a surface of a heat transfer portion is a constantly wetted surface, in which a concentrate does not adhere to a wall surface, and in which the heat transfer surface area can be enlarged.

2. Background Art

Generally speaking, most concentration devices are of the type in which the heat is transferred to a liquid by passing a heating medium through a jacket of a wall surface outer portion or coils within the device, and the liquid is evaporated. In such a concentration device, if the heating portion, such as the coils, is arranged above the liquid surface, then it is not only impossible to use the heat effectively because the heat is not transferred to the liquid, but often scorching occurs at the interface between a liquid and air, adhering matter is deposited and burned, which makes cleaning difficult.

In order to overcome these disadvantages, for example Japanese Laid-Open Patent Publication No. 6-335627 describes a device in which the liquid is spouted on an inner wall surface of the concentration device, thereby enlarging the heat transfer surface area. In this device, the evaporation efficiency is improved greatly by enlarging the evaporation surface area, and the inner wall surface is a constantly wetted surface. Therefore, this device has superior effects that it is possible to prevent scorching at the interface between a liquid and air as well as the depositing and burning of adhering matter, and that cleaning can be performed easily. Compared to the concentration rate using a conventional device, the concentration rate of the liquid using this device is greatly improved, but further improvements are desired.

DISCLOSURE OF INVENTION

It is an object of the present invention to further improve this excellent device, and to provide a device with extremely high heat transfer efficiency. If the heat transfer device is employed as a concentration device, then it is an object to provide a concentration device with the effect that the scorching of concentrate at the interface between a liquid and air as well as the depositing and burning of adhering matter is prevented, and that cleaning can be performed easily, and moreover that the concentration device has an excellent concentration rate.

As a result of intense research toward solving this problem, the inventors completed a device with excellent heat transfer efficiency by arranging at least one auxiliary heat transfer means inside an agitation tank and keeping an outer surface of the auxiliary heat transfer means constantly in a wetted state. Moreover, they discovered that, if the device of the present invention is employed as a concentration device, there is the effect that the scorching at the interface between a liquid and air as well as the depositing and burning of adhering matter is prevented, and that cleaning can be performed easily, and moreover that the device has an excellent concentration rate, thereby arriving at the present invention.

That is to say, the present invention provides a heat transfer device having an agitation tank, a liquid circulation means for circulating a liquid along a tank wall of the agitation tank, and at least one auxiliary heat transfer means provided inside the agitation tank, wherein an outer surface of the auxiliary heat transfer means is constantly put in a wetted surface state. In the following, this device is referred to as first heat transfer device.

In a preferable embodiment, the liquid circulation means is made of a rotation shaft and one or more liquid feeding means that are mounted to that rotation shaft, wherein the auxiliary heat transfer means is a heat transfer coil or a heat transfer cylinder, and wherein the liquid is scattered from a portion of the liquid spouting device to the heat transfer coil or the heat transfer cylinder, so that an outer surface of the heat transfer coil or the heat transfer cylinder becomes a wetted surface.

In another preferable embodiment, the liquid spouting device has one or more hole midway in the liquid feeding means, or two or more liquid feeding means of different length.

In yet another preferable embodiment, the liquid spouting device has a structure of a truncated cone having a double cylinder-shaped hollow portion, a heating medium is supplied to the hollow portion of that truncated cone, and moreover, if necessary, a dispersion plate is provided at a portion above the truncated cone, the liquid is lifted along an inner surface of the truncated cone by rotation of the truncated cone, some or all of the lifted liquid drops along an outer surface of the truncated cone, and the truncated cone has a constantly wetted surface.

In a preferable embodiment, the tank wall has an inclination.

Moreover, in yet another preferable embodiment, the auxiliary heat transfer means is made of a first cylinder and a second cylinder arranged inwardly from the first cylinder and attached to a bottom portion of the heat transfer device, an upper surface of the first cylinder is arranged lower than an upper surface of the second cylinder, and the liquid flows along the first cylinder to the second cylinder, and flows down from an upper portion of the second cylinder along a cylinder wall of the second cylinder.

Moreover, the present invention provides a crystallizer having an agitation tank, a liquid circulation means for circulating a liquid or slurry along a tank wall of the agitation tank, and at least one auxiliary heat transfer means that is provided above a liquid surface inside the agitation tank, and that creates a temperature difference to the heat transfer means provided in the agitation tank, wherein an outer surface of the auxiliary heat transfer means is constantly put in a wetted surface state. In the following, this device is referred to as first crystallizer.

In a preferable embodiment, the auxiliary heat transfer means is arranged above the liquid surface inside the agitation tank.

In a preferable embodiment, the tank wall of the agitation tank has an inclination.

The present invention moreover provides a heat transfer device having an agitation tank and a liquid circulation means for circulating a liquid along a tank wall of the agitation tank, wherein the tank wall of the agitation tank has an inclination. In the following, this device is referred to as second heat transfer device.

Moreover, another present invention provides a crystallizer having an agitation tank and a liquid circulation means for circulating a liquid or slurry along a tank wall of the agitation tank, wherein the tank wall of the agitation tank has an inclination, and wherein the agitation tank is provided with at least two heat transfer means, with which a temperature difference can be created. In the following, this device is referred to as second crystallizer.

BEST MODE FOR CARRYING OUT THE INVENTION

A first heat transfer device of the present invention includes an agitation tank, a liquid circulation means for circulating a liquid along a tank wall of the agitation tank and at least one auxiliary heat transfer means provided inside the agitation tank wherein an outer surface of the auxiliary heat transfer means is constantly put in a wetted surface state.

The first heat transfer device of the present invention is characterized by the fact that it has a liquid circulation means, such as a liquid spouting device, and by the fact that the outer surface of the at least one auxiliary heat transfer means provided inside the agitation tank is constantly in a wetted surface state. Consequently, in the heat transfer device of the present invention, since the heat propagating portion of the tank wall and the surface of the auxiliary heat transfer portion inside the tank are constantly wetted, it is possible to prevent the scorching of concentrate at the interface between a liquid and air as well as the depositing and burning of adhering matter. Consequently, it is not only possible to attain the effect that cleaning can be performed easily, but also, since the heat transfer surface area can be enlarged, the effect is displayed that the concentration rate can be increased even further.

It is preferable that the liquid circulation means employed in the present invention is a means for circulating a liquid or slurry along the tank shape of the agitation tank. Examples of this are a means for lifting the liquid or slurry to an upper portion of the agitation tank using a circulation pump and letting it flow from the upper portion along the tank wall, a means for letting the liquid or slurry flow along the tank wall from an upper portion of the agitation tank with a spray nozzle or the like, and a means for spouting the liquid or slurry toward the tank wall. Among these, it is most preferable to use a liquid spouting device for pumping the liquid or slurry to an upper portion of the agitation tank utilizing Bernoulli's theorem and/or centrifugal force and spout it to the tank wall.

The following is an explanation of a first heat transfer device having a liquid spouting device. Needless to say, the present invention is not limited to examples using a liquid spouting device.

Figure 1:
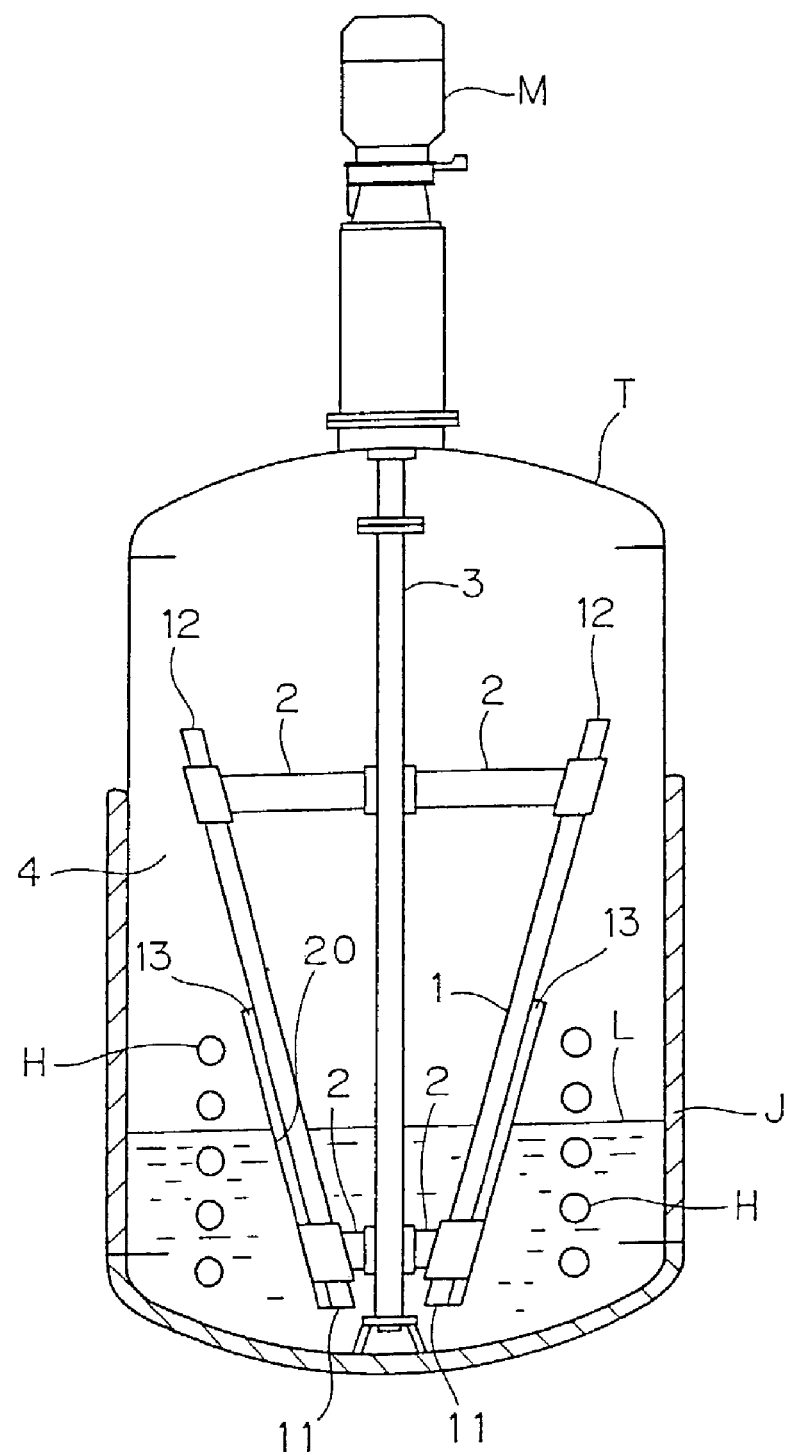
FIG. 1 shows an embodiment of a heat transfer device of the present invention.

FIG. 1 shows a cross-sectional view of an embodiment of a heat transfer device of the present invention. An agitation tank T is provided with a motor M to which a rotation shaft 3 is attached. A liquid spouting device 4 is made of liquid feeding means 1, which are hollow pipe members, and an attachment device 2, and is mounted on the rotation shaft 3. J denotes a heat transfer means for transferring heat from outside the agitation tank T, and H denotes an auxiliary heat transfer means provided inside the agitation tank T. The device in FIG. 1 has a liquid feeding and scattering means 20 using pipe-shaped members of two kinds, long and short, as the liquid spouting means 4. The liquid spouted from aperture portions 12 of the longer pipe-shaped members of this liquid feeding and scattering means 20 reaches the inner wall of the agitation tank T and flows down the inner wall back to the mother liquor, and while doing so, the entire surface over which heat is transferred from the outer heat transfer means J becomes a wetted surface, so that the heat from the outer heat transfer means J can utilized very efficiently. Furthermore, the liquid from the liquid scattering means 13, which is made of short pipe-shaped members, falls onto the auxiliary heat transfer means H (in this case a coil) provided inside the agitation tank T, and it drops down along the auxiliary heat transfer means H, so that the heat transfer surface of the auxiliary heat transfer means H is constantly a wetted surface. Consequently, the entire surfaces of both the outer heat transfer means J and the auxiliary heat transfer means H can be made into wetted surfaces, so that heat exchange with high efficiency becomes possible, and it is possible to attain excellent evaporation rate when using it as an evaporator.

It should be noted that the rotation speed of the liquid spouting device may be adjusted such that the liquid from the liquid scattering means 13 made of the short pipe-shaped members drops onto the auxiliary heat transfer means H. To achieve this more reliably, for example, it is preferable that a dispersion plate 15 as shown in FIG. 3(d) is arranged along a circumference of the agitation tank T.

Figure 2:
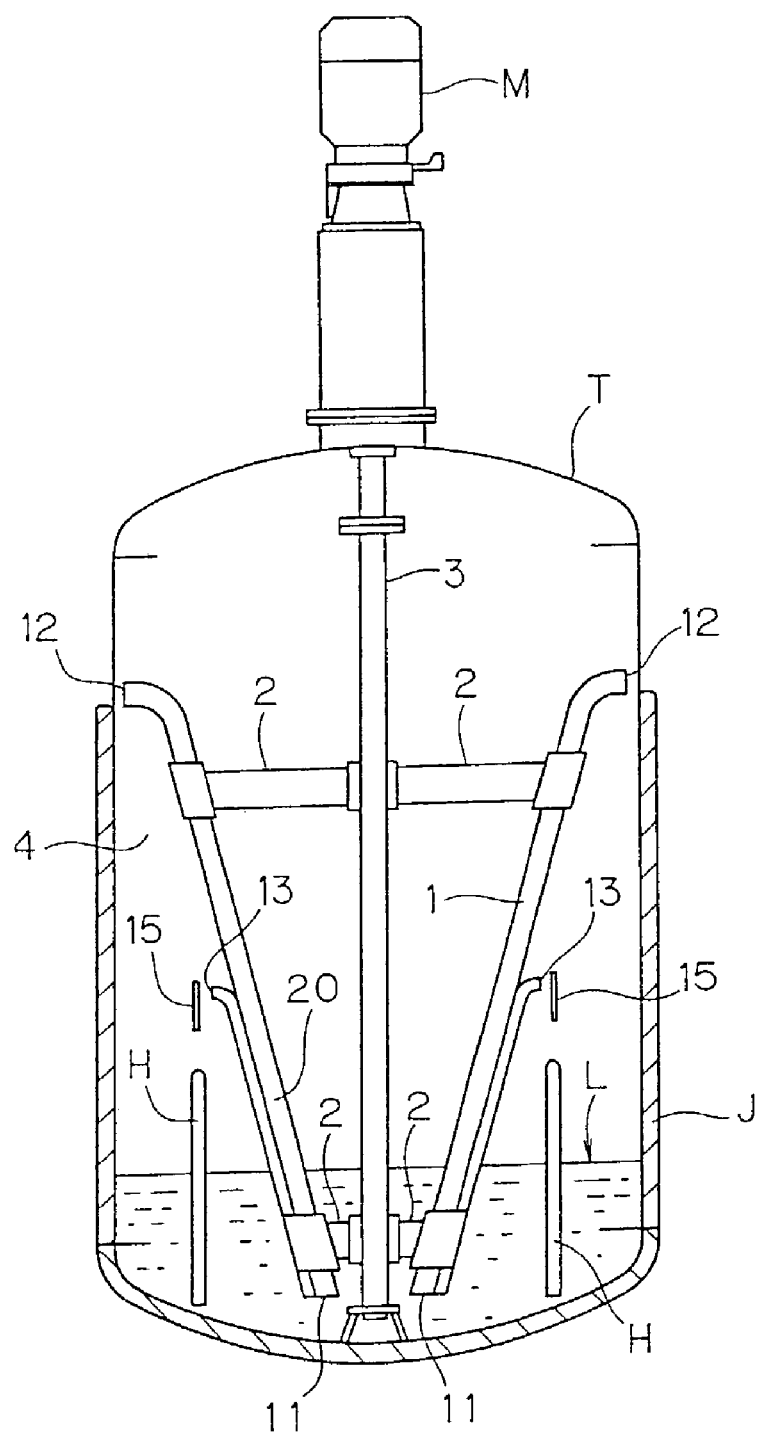
FIG. 2 shows another embodiment of a heat transfer device of the present invention.

FIG. 2 shows a cross-sectional view of another embodiment of a heat transfer device of the present invention. In this device, the auxiliary heat transfer means H is a heat transfer cylinder, and this auxiliary heat transfer means H (heat transfer cylinder) is arranged such that there is a spacing between the auxiliary heat transfer means H and the bottom of the agitation tank T, and the liquid can move through this spacing. As in FIG. 1, the device shown in FIG. 2 has a liquid feeding and scattering means 20 that uses two kinds of pipe-shaped members, long and short. The long pipe-shaped members are bent in such a manner that the upper aperture portions 12 face the wall surface of the agitation tank T almost perpendicularly. On the other hand, the front ends of the short pipe-shaped members (liquid scattering means 13) are also bent, and the dispersion plate 15 is arranged in front of them, along an inner circumference of the agitation tank T. Moreover, the auxiliary heat transfer means H is arranged directly below the dispersion plate 15. The liquid spouted from the liquid scattering means 13 is blocked by the dispersion plate 15 and drops onto the auxiliary heat transfer means H directly below it.

As in FIG. 1, the liquid spouted from the upper aperture portions 12 of the longer pipe-shaped members hits the inner wall of the agitation tank T and flows down the inner wall back to the mother liquor, and while doing so, the entire surface over which heat is transferred from the outer heat transfer means J becomes a wetted surface, so that the heat from the outer heat transfer means J can be utilized very efficiently. Furthermore, the liquid from the liquid scattering means 13, which is made of short pipe-shaped members, falls onto the auxiliary heat transfer means H (in this case, a heat transfer cylinder) provided inside the agitation tank T, and since it drops down along the auxiliary heat transfer means H, the heat transfer surface of the auxiliary heat transfer means H is constantly a wetted surface. Consequently, all surfaces of the outer heat transfer means J and the auxiliary heat transfer means H can be made into wetted surfaces, so that heat exchange with high efficiency becomes possible, and it is possible to attain an excellent evaporation rate when using it as an evaporator.

Figure 3:
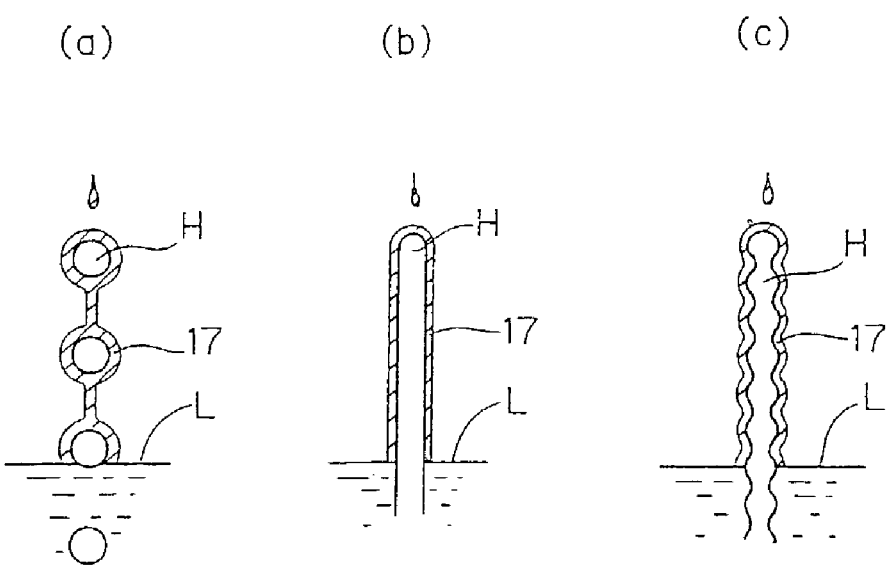
FIG. 3 is schematic diagrams showing how a liquid passes along the auxiliary heat transfer means.
Figure 3:
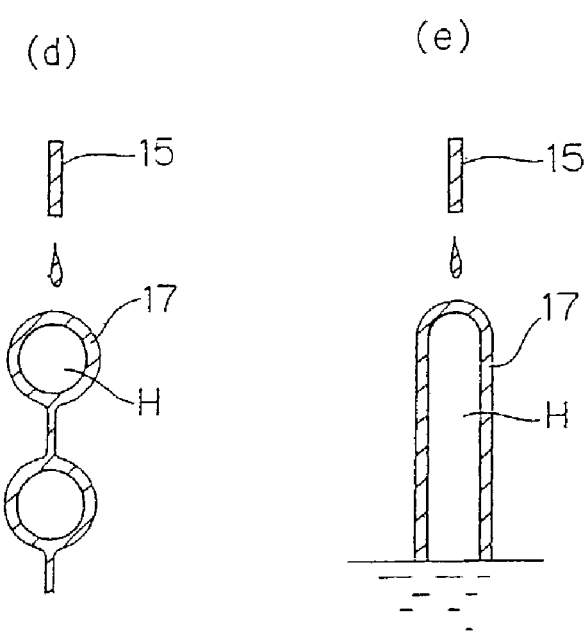

The shape of the auxiliary heat transfer means H is not limited to the heat transfer coil of FIG. 1 and the heat transfer cylinder of FIG. 2, and there is no particular restriction, as long as the shape is such that a wetted surface can be constantly formed by the liquid. Mechanisms by which the outer surface of the auxiliary heat transfer means H is made a constantly wetted surface are illustrated in FIG. 3. For example, if the auxiliary heat transfer means H is a coil (FIG. 3(a)) or if it is a heat transfer cylinder (FIG. 3(b)), then the liquid behaves as shown in those drawings, and a liquid film 17 is formed, so that the heat transfer surface is constantly a wetted surface. Furthermore, it may also be of a corrugated shape as shown in FIG. 3(c), and with this shape, the heat transfer surface area can be enlarged even further.

Moreover, as shown in FIGS. 3(d) and (e), it is possible to arrange the dispersion plate 15 above the auxiliary heat transfer means H, so that liquid that has reached to the dispersion plate 15 flows down onto the auxiliary heat transfer means H. With regard to reliability, it is more preferable to use the dispersion plate 15. By using the dispersion plate, the outer surface of the auxiliary heat transfer means H becomes a constantly wetted surface.

It should be noted that, as shown in FIG. 1 and FIG. 2, in the liquid feeding means 1 employed for the device of the present invention, the lower aperture portions 11 are arranged below the liquid surface L, the upper aperture portions 12 are exposed above the liquid surface L, and the liquid feeding means 1 is mounted to the attachment devices 2 at a certain oblique angle. The liquid spouting device 4 rotates together with the rotation of the rotation shaft 3, the liquid is taken up from the lower aperture portions 11 of the liquid feeding means 1, caused to travel through the liquid feeding means 1, and the liquid is spouted from the upper aperture portions 12, such that the spouted liquid comes into contact with the upper wall of the agitation tank T. Thus, the inner wall of the agitation tank T that is in contact with the heat transfer means J becomes a constantly wetted surface.

Furthermore, the liquid spouting devices 4 shown in FIG. 1 and FIG. 2 are merely examples, and for the liquid spouting device 4 employed for the heat transfer device of the present invention, the device disclosed in Japanese Laid-Open Patent Publication No. 6-335627 is used, for example. The liquid feeding means 1 attached to the liquid spouting device 4 may be of any shape, as long as with the rotation of the rotation shaft 3, the liquid or slurry can be moved by Bernoulli's theorem and/or centrifugal force. For example, other examples than the pipe members shown in FIG. 1 are gutter-shaped members, plate-shaped members, hollow tubes shaped like truncated cones without a bottom or the like.

In the heat transfer devices shown in FIG. 1 and FIG. 2 of the present invention, a liquid scattering means 13 for scattering the liquid to the upper surface of the auxiliary heat transfer means H is employed to provide the auxiliary heat transfer means H constantly with a wetted surface. Examples of this liquid scattering means 13 are shown in FIG. 1 and FIG. 2, but it is explained in more detailed with FIG. 4.

FIG. 4(a) shows an example of the case that a hole 14 is provided midway in the liquid feeding means 1, and FIG. 4(b) shows an example of the case that a guide 18 (for example, a pipe or a gutter) is provided midway in the liquid feeding means 1. FIG. 4(c) is an example of the case that a liquid feeding means of length that is different from the liquid feeding means 1 is employed as a liquid scattering means 13, and shows a liquid feeding and scattering means 20 in which the liquid feeding means 1 made of a pipe member is formed in one piece with a liquid scattering means 13 made of a pipe member that is shorter than the liquid feeding means 1. By attaching this liquid feeding and scattering means 20 as a liquid feeding means 1 as shown in FIG. 1 or FIG. 2., and rotating the rotation shaft 3, the liquid is spouted and scattered on the upper wall surface of the agitation tank T and on the auxiliary heat transfer means H. Of course, the liquid feeding means 1 and the liquid scattering means 13 do not necessarily have to be provided in one piece, and may also be provided separately, giving consideration to the spouting or scattering positions of the liquid, and if necessary at different angles. It should be noted that the liquid scattering means 13 does not necessarily have to be a pipe member, and can also be gutter-shaped or the like.

FIG. 4(d) is a diagram of the case that the liquid feeding means 1 is a gutter-shaped member 5, and also the liquid scattering means 13 is a gutter-shaped member. FIG. 4(e) is a diagrammatic view of the case that the liquid feeding means 1 is a gutter-shaped member, and the liquid scattering means 13 is a plate-shaped member. In this case, it is desirable that the liquid feeding means 1 and the liquid scattering means 13 are provided in one piece. FIG. 4(f) is a diagrammatic view of the case that a barrage 19 is provided midway in the gutter-shaped member of the liquid feeding means 1. With this device, the flow direction of a portion of the liquid that is being fed is changed by the barrage 19 and drops onto the auxiliary heat transfer means H.

Figure 4:
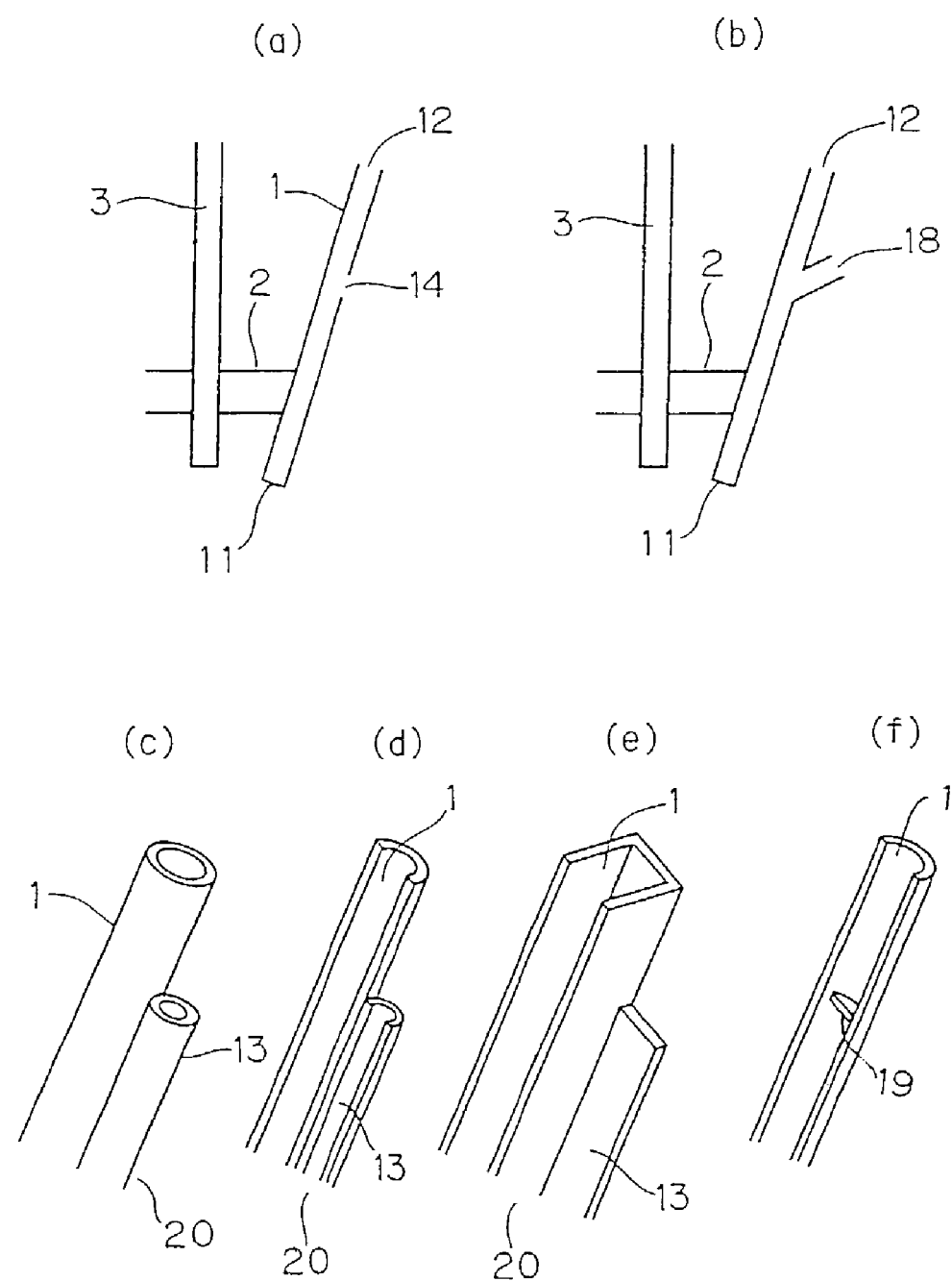
FIG. 4 shows examples of a liquid scattering means.

If the liquid feeding means 1 in FIG. 4 is provided with a hole 14, a guide 18 or the like or if a liquid feeding means that is shorter than the liquid feeding means 1 is attached to the liquid feeding means 1 to form a liquid feeding and scattering means 20, then the position at which the hole 14, the guide 18 or the barrage 19 are provided should be decided in consideration of the rotation speed, the attachment angle and the like, and the configuration should be such that the liquid is constantly scattered to the uppermost surface of the auxiliary heat transfer means H. The liquid that is scattered onto the auxiliary heat transfer means H moves downward due to gravity and the viscosity of the liquid, and the outer surface of the auxiliary heat transfer means H becomes a constantly wetted surface (see FIG. 3).

Moreover, as explained in FIG. 2 and FIG. 3(*d*), in the present invention, it is also one of the preferable embodiments to provide the agitation tank with a dispersion plate. If a liquid scattering means 13 is used, then it is also possible to make the dispersion plate shiftable so that it is hit by the liquid spouted from the liquid spouting portion, or to fix the dispersion plate and let the spouted liquid hit the dispersion plate by changing the rotation speed of the liquid spouting device.

It should be noted that in FIG. 1 and FIG. 2, the auxiliary heat transfer means H may first be underneath the liquid surface. Using one of the above-described means, the liquid should constantly come in contact with the auxiliary heat transfer means H, as the concentration proceeds and the auxiliary heat transfer means H is exposed above the liquid surface. For example, if the liquid is supplied continuously from the liquid scattering means 13 to the auxiliary heat transfer means H, then the outer surface of the auxiliary heat transfer means H becomes a constantly wetted surface.

With the configurations shown in FIG. 1 and FIG. 2, all of the heat transfer portion of the heating means J for heating from the outside and the heat transfer portion of the inner auxiliary heat transfer means H function constantly as heat transfer portions, so that the heat transfer surface area can be enlarged, and the heat transfer rate can be improved considerably compared to conventional devices relying on heat transfer from the outside.

Figure 5:
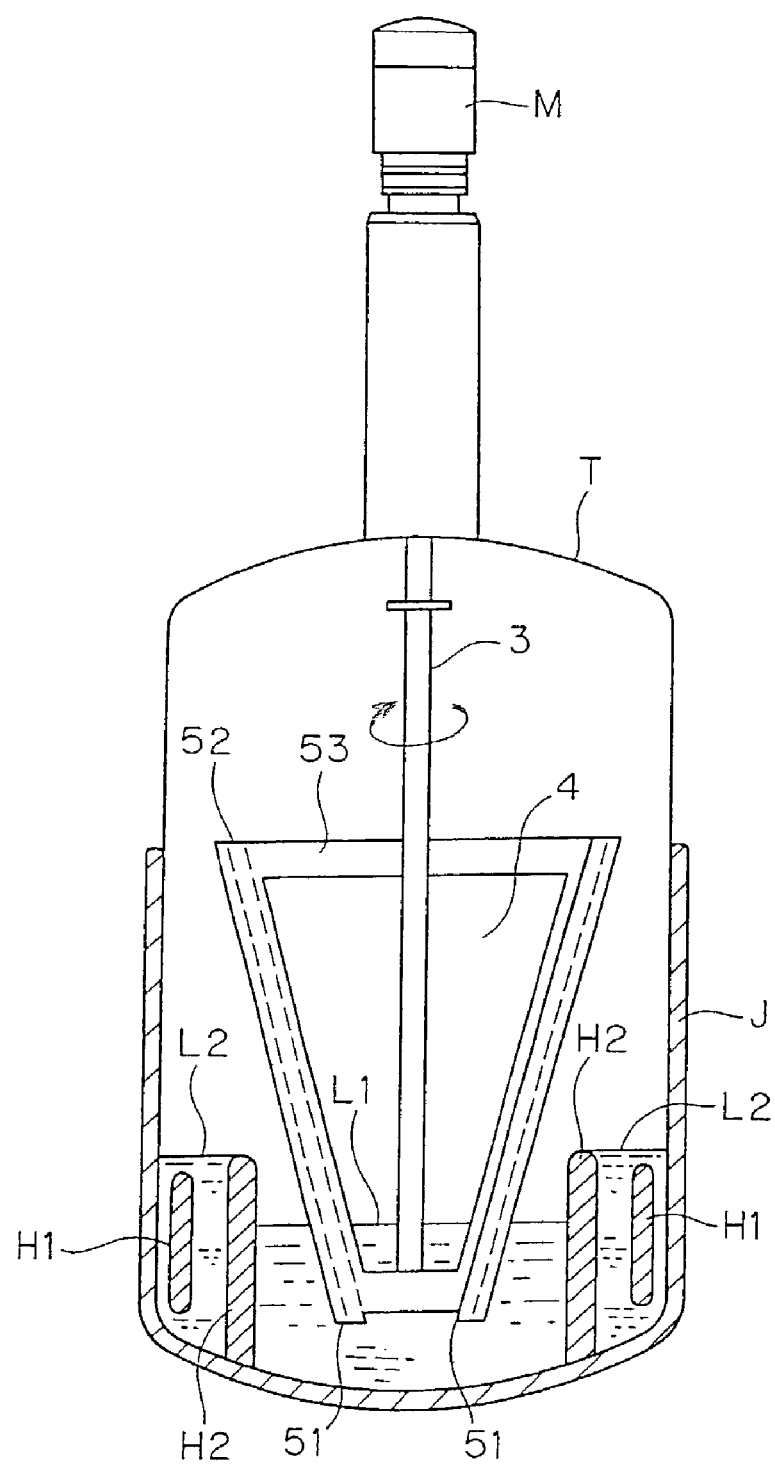
FIG. 5 is a diagram showing another embodiment of the present invention.

FIG. 5 shows an example of a heat transfer device in which the auxiliary heat transfer means H uses two heat transfer cylinders. The heat transfer device in FIG. 5 includes a liquid spouting device 4 made of gutter-shaped members 5 and flat portions 53, a first heat transfer cylinder H1, and a second heat transfer cylinder H2 arranged inward from the first heat transfer cylinder H1. The second heat transfer cylinder H2 is arranged at the lower portion of the agitation tank T, and dams up the liquid. The upper portion of the first heat transfer cylinder H1 is formed such that it comes below the liquid surface L2 that is formed by the second heat transfer cylinder H2 (that is, such that the first heat transfer cylinder H1 is constantly below the liquid surface), and the heat transfer cylinder H1 is configured such that the liquid can pass below or through the lower portion of the heat transfer cylinder H1, for example by providing holes at the lower portion of the heat transfer cylinder or by raising it above the bottom surface of the agitation tank T.

By rotating the rotation shaft 3 such that the gutter-shaped members 5 attached to the rotation shaft 3 lead and the flat members 53 trail (in the direction of the arrows in the drawing), the liquid is lifted from the lower aperture portions 51 of the gutter-shaped members 5, and spouted from the upper aperture portions 52 against the inner wall of the agitation tank T. The spouted liquid flows down along the inner wall of the agitation tank T, and passes below the first heat transfer cylinder H1 or above the first heat transfer cylinder H1. When the liquid surface L1 is at a position that is lower than the liquid surface L2, then the liquid that is dammed up by the second heat transfer cylinder H2 flows down along the surface of the second heat transfer cylinder H2. Thus, even though it is a small amount of liquid, it can be reliably supplied to the heat transfer surface.

It should be noted that in FIG. 5, it is also possible to use a heat transfer coil instead of the first heat transfer cylinder H1, and in this case, the entire heat transfer coil is arranged such that it is below the liquid surface L2.

Moreover, in the heat transfer device of FIG. 5, it is also possible to provide three or more auxiliary heat transfer means H. In that case, it is necessary to set the height of the innermost heat transfer cylinder higher than the height of the other heat transfer cylinders or heat transfer coils, such that the other heat transfer cylinders or heat transfer coils are constantly below the liquid surface L2.

Figure 6:
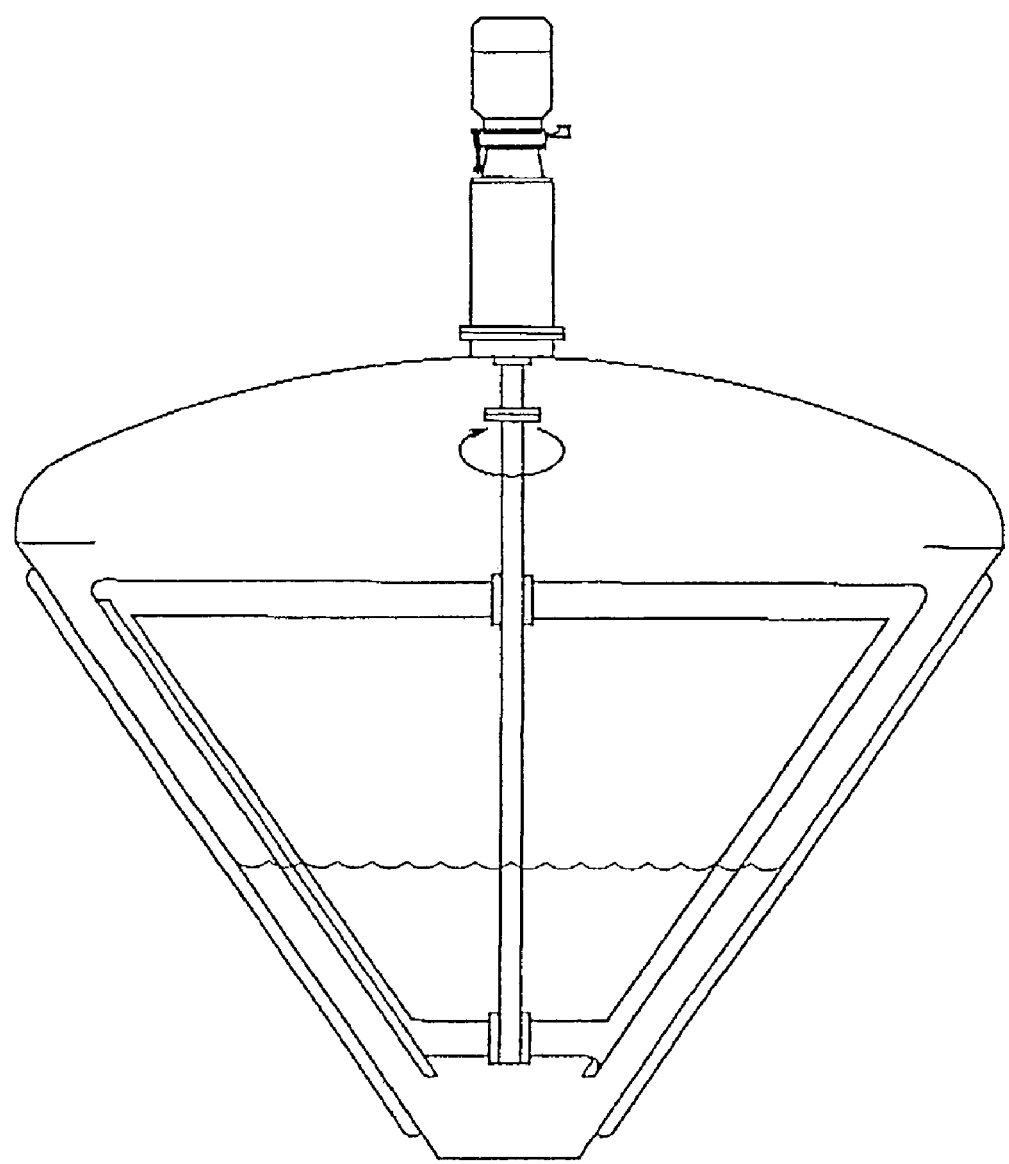
FIG. 6 shows an example of a heat transfer device of the present invention, in which the tank wall has an inclination.
Figure 7:
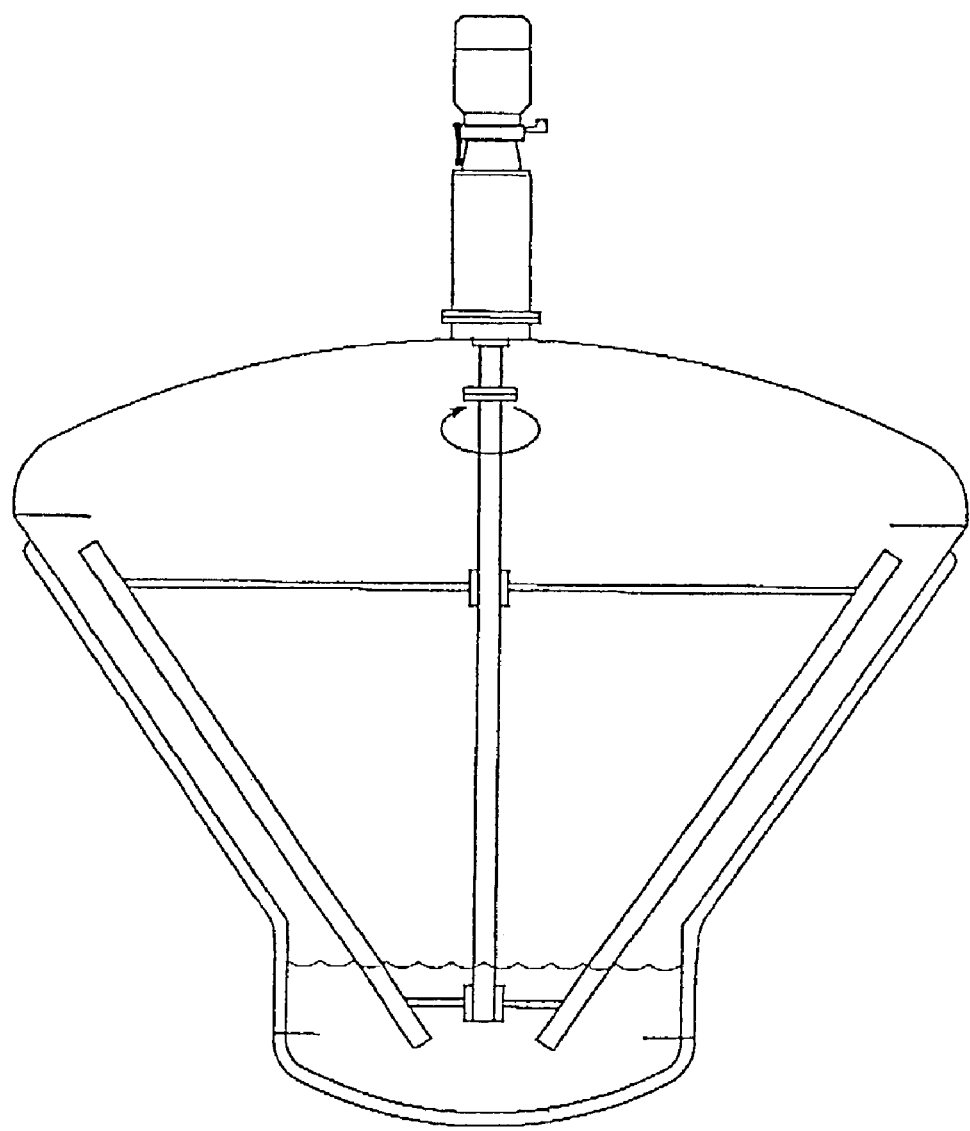
FIG. 7 shows another example of a heat transfer device of the present invention, in which the tank wall has an inclination.

In the first heat transfer device of the present invention, it is possible to provide the tank wall with an inclination. By providing the tank wall with an inclination, the heat transfer surface area can be made even larger, and the evaporation efficiency can be increased. There is no limitation to the shape of the inclination, and, for example, cone shapes as shown in FIG. 6 and FIG. 7 are preferable.

Furthermore, the second heat transfer device of the present invention has an agitation tank and a liquid circulation means for circulating a liquid along a tank wall of the agitation tank, and the tank wall of the agitation tank has an inclination. Examples of this are shown in FIG. 6 and FIG. 7. Compared to conventional devices not having an inclination, the heat transfer surface area can be made larger with the second heat transfer device of this shape, so that the evaporation efficiency is improved considerably.

Figure 8:
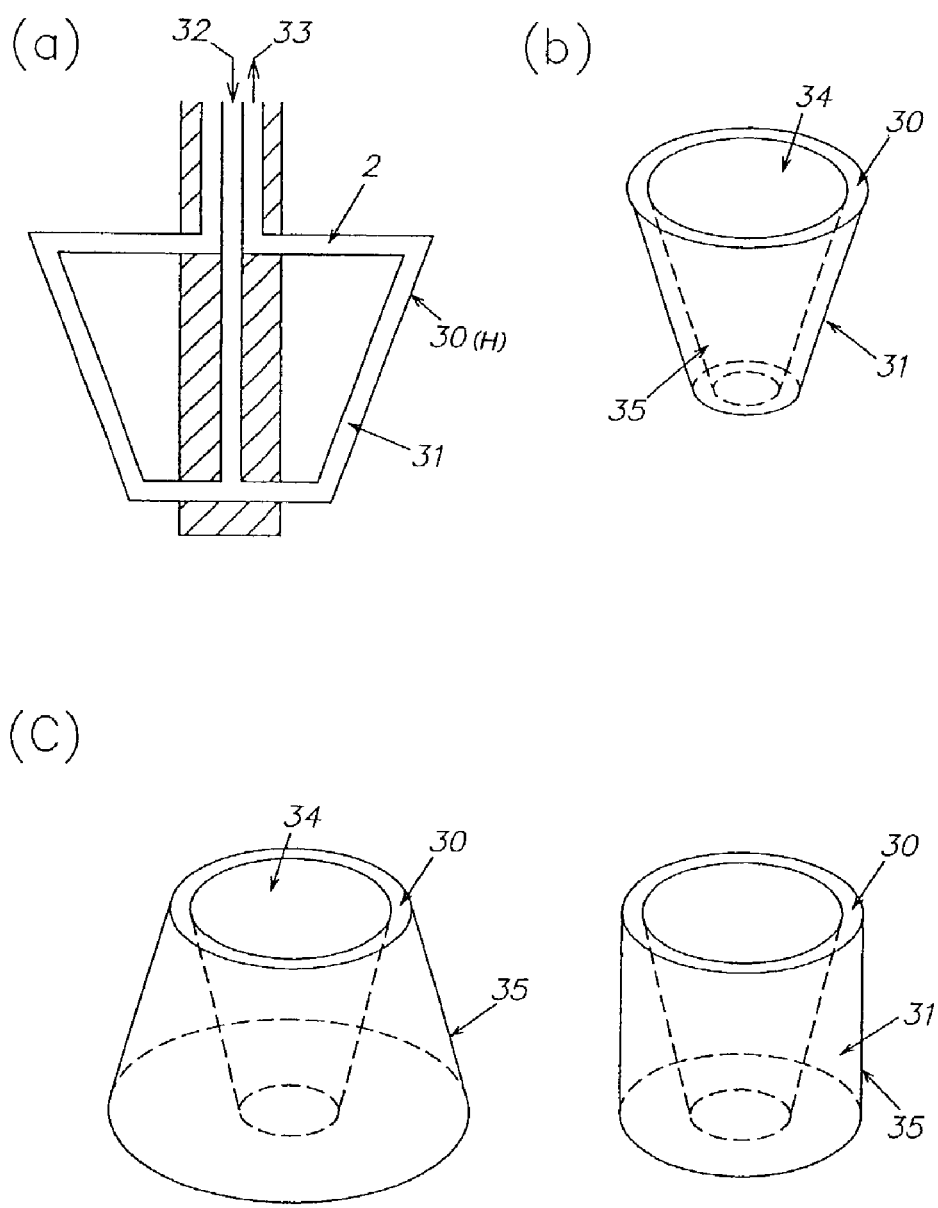
FIG. 8 shows examples of a heat transfer device of the present invention, in which the liquid spouting device is an auxiliary heat transfer means.

Another example of the liquid spouting device employed in the first and the second heat transfer device is shown in FIG. 8. FIG. 8(*a*) is a cross-sectional view of a truncated cone 30 having a double cylinder-shaped hollow portion 31 separated from the outside, serving as the liquid spouting device 4. FIG. 8(*b*) is a diagrammatic view showing the shape of this truncated cone 30. The hollow portion 31 has a structure in which a heating medium (for example, vapor 32) is supplied through the attachment devices 2 to the hollow portion 31 and after the heat exchange, the heating medium (for example, condensed liquid 33) is collected again. Consequently, the truncated cone 30 of the liquid spouting device 4 serves as the auxiliary heat transfer means H. Moreover, the configuration is such that when the truncated cone 30 is rotated, the liquid is elevated along the inner surface 34, and a portion of the elevated liquid hits the dispersion plate 15 that is provided, as necessary, in the spouting direction of the liquid, and runs down along the outer surface 35. Consequently, the truncated cone 30, which serves as the auxiliary heat transfer means H, constantly has a wetted surface, and heat transfer can be adequately performed. Moreover, by providing the truncated cone 30 with the shape shown in FIG. 8(*c*), the outer surface 35 of the truncated cone 30 becomes a surface wetted by the naturally dropping liquid, even when no dispersion plate 15 is installed. Thus, by providing the liquid feeding means with the structure of a truncated cone 30 having a double cylinder-shaped hollow portion 31, by supplying a heating medium to the hollow portion 31 and using the truncated cone 30 as an auxiliary heat transfer means H, and by installing, as necessary, a dispersion plate 15 to make the outer surface 35 of the truncated cone 30 into a wetted surface, a heat transfer device is provided, in which the auxiliary heat transfer means H constantly has a wetted surface.

Moreover, in another embodiment, a configuration is possible in which a double cylinder-shaped truncated cone is formed in which the liquid is elevated between the outer cylinder and the inner cylinder and scattered, and the auxiliary heat transfer means H is arranged between the outer cylinder and the inner cylinder. With this configuration, the auxiliary heat transfer means H constantly has a wetted surface, and the liquid is subjected to heat exchange while being in motion, so that a heat transfer device with high efficiency is provided.

If the auxiliary heat transfer means employed in the heat transfer device of the present invention is a means for heating vapor, a heating medium or the like, then the heat transfer device of the present invention has a concentration efficiency that is very superior for a concentration device. Moreover, if the auxiliary heat transfer means is a cooling medium, then it is utilized as a cooling device having a very superior cooling efficiency.

The first and the second heat transfer device of the present invention can also be employed as a crystallizer. A first crystallizer of the present invention is the first heat transfer device, which is provided with at least two heat transfer means, formed such that a temperature difference occurs between these heat transfer means. That is to say, the first crystallizer is provided with an agitation tank, a liquid circulation means for circulating a liquid or slurry along a tank wall of the agitation tank, and at least one auxiliary heat transfer means that is provided inside the agitation tank, creating a temperature difference to the heat transfer means provided in the agitation tank. There may be one or more heat transfer means provided in the agitation tank. Moreover, there may be one or more auxiliary heat transfer means. If the auxiliary heat transfer means includes a plurality of heat transfer means, then a temperature difference to at least one heat transfer means should be created.

Figure 9:
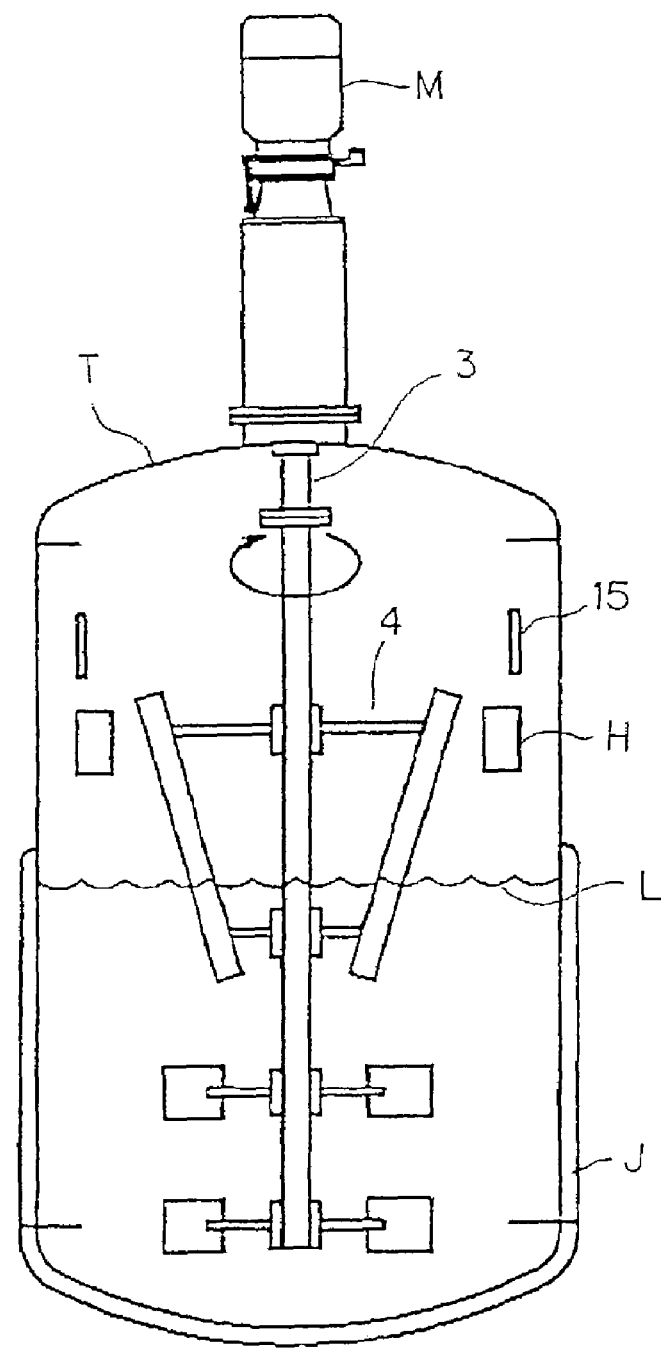
FIG. 9 shows an example of a crystallizer of the present invention, in which the auxiliary heat transfer means is a heat transfer cylinder.
Figure 10:
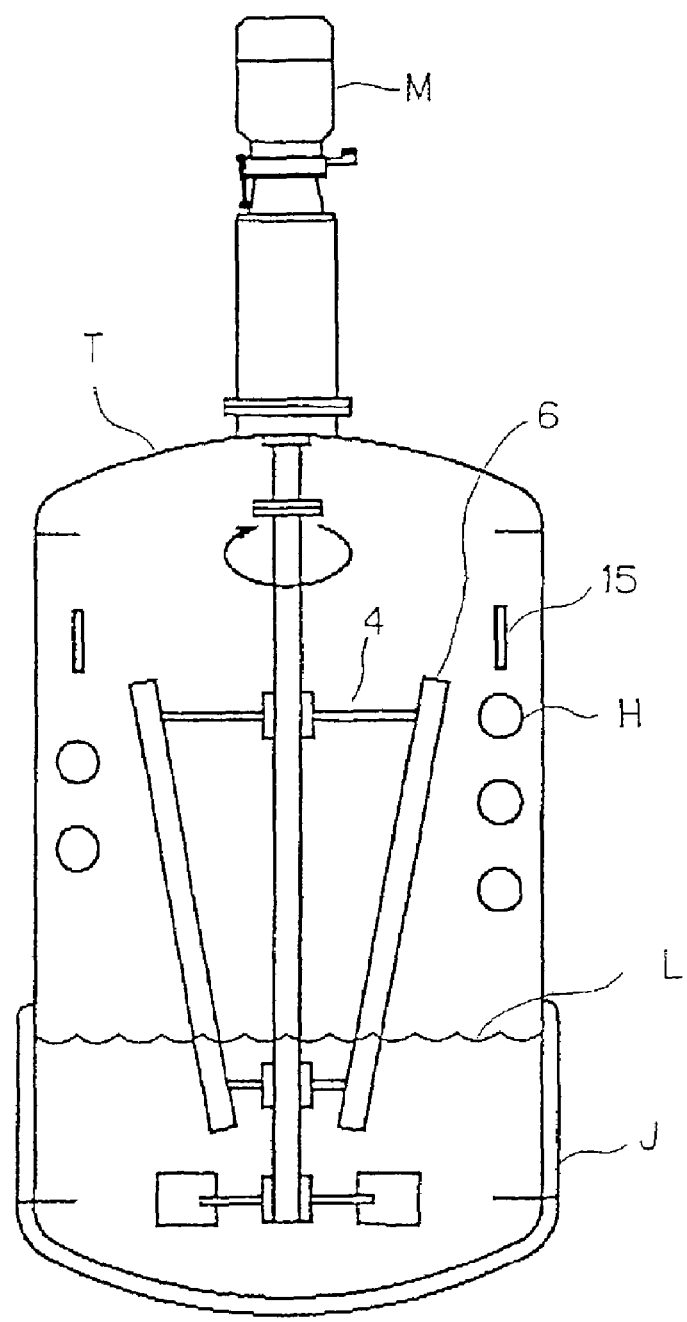
FIG. 10 shows an example of a crystallizer of the present invention, in which the auxiliary heat transfer means is a coil.

FIG. 9 and FIG. 10 show a crystallizer having one heat transfer means and one auxiliary heat transfer means. The device in FIG. 9 uses pipes 6 as the liquid spouting means 4, and rotating the liquid spouting means scatters a liquid from above the pipes 6 by a dispersion plate 15 arranged around the liquid spouting means 4, and the liquid is returned to the mother liquor while passing along the outer surface of the auxiliary heat transfer means H (in this case, a heat transfer cylinder). The auxiliary heat transfer means H is installed above the liquid surface L.

If employed as a cooling crystallizer, the temperature of the auxiliary heat transfer means H set higher than that of the heat transfer means J. In FIG. 9, when slurry containing microcrystals created by cooling is spouted from the liquid spouting means 4, the microcrystals in the slurry are dissolved as they pass through the region that is heated by the auxiliary heat transfer means H, and a liquid of high concentration is flowed back to the cooling portion along the auxiliary heat transfer means H (heat transfer cylinder). With the crystallizer of the present invention, the induction period for crystal generation is shortened, and crystals with a narrow size distribution and large size can be obtained.

If employed as a concentration crystallizer, then the temperature of the lower heat transfer means J is set higher than that of the auxiliary heat transfer means H. In FIG. 9, when slurry containing microcrystals is spouted from the liquid spouting means 4, the crystallization is accelerated as the microcrystals in the slurry pass through the region that is cooled by the auxiliary heat transfer means H, and the slurry flows back along the cooling surface of the auxiliary heat transfer means H (heat transfer cylinder), so that the crystallization rate can be increased. With this device, the induction period for crystal generation is shortened, and crystals with a narrow size distribution and large size can be obtained. FIG. 10 shows the case that a coil is used as the auxiliary heat transfer means H.

Figure 11:
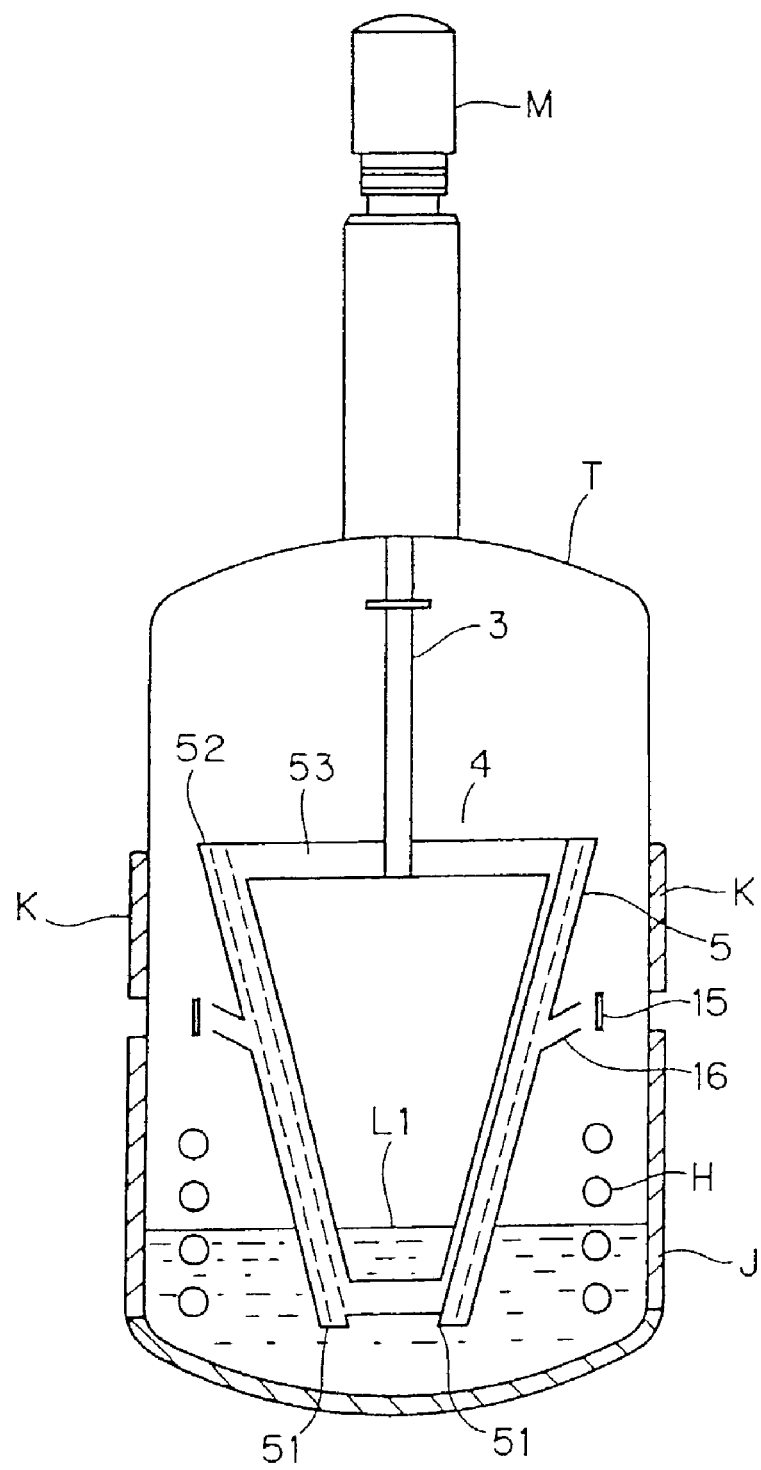
FIG. 11 shows an example of a crystallizer of the present invention.

Moreover, FIG. 11 shows an example of a crystallizer having two heat transfer means and one auxiliary heat transfer means. As shown in FIG. 11, a heat transfer means K and a heat transfer means J are arranged independently at an upper portion and a lower portion of the agitation tank T. A temperature difference is created between the heat transfer means J and K The device of FIG. 11 uses gutter-shaped members 5 as the liquid spouting means 4, branches 16 are arranged midway in the gutter-shaped members 5, and a liquid is spouted from those branches 16. This liquid is scattered over the heat transfer means K from above the gutter-shaped members 5, and the liquid flows back to the mother liquor, passing along the heat transfer means K and the heat transfer means J. The liquid spouted from the branches 16 hits a dispersion plate 15 disposed along a circumference of the device, and drops onto the coil serving as the auxiliary heat transfer means H arranged directly below, so that the coil constantly has a wetted surface.

If employed as a cooling crystallizer, the temperature of the upper heat transfer means K is set higher than that of the lower heat transfer means J. The temperature of the auxiliary heat transfer means H is set to be lower than the temperature of the upper heat transfer means K and about the same as the temperature of the lower heat transfer means J. When the slurry containing microcrystals generated by cooling is spouted from the liquid spouting means 4, the microcrystals in the slurry are dissolved as they pass through the region that is heated by the heat transfer means K, and a liquid of high concentration is flowed back to the cooling portion along the inner wall. In this cooling portion, the cooling heat transfer surface area is enlarged with the auxiliary heat transfer means H, and the entire heat transfer portion is used, so that the cooling rate can be increased. Therefore, the induction period for crystal generation is shortened, and crystals with a narrow size distribution and large size can be obtained.

If employed as a concentration crystallizer, then the temperature of the lower heat transfer means J and the auxiliary heat transfer means H is set higher than that of the upper heat transfer means K The lower heat transfer means J and the auxiliary heat transfer means H may be at substantially the same temperature. When the slurry containing microcrystals is spouted from the liquid spouting means 4, the crystallization is accelerated as the microcrystals in the slurry pass through the region that is cooled by the upper heat transfer means K, and the slurry flows back along the cooling inner wall, so that the crystallization rate can be increased. At the lower heating portion, the heating heat transfer surface area is enlarged with the auxiliary heat transfer means H, and all heat transfer portions are used, so that the evaporation rate can be increased. Therefore, the induction period for crystal generation is shortened, and crystals with a narrow size distribution and large size can be obtained.

Furthermore, also in cases in which no concentration is involved, it is possible to carry out crystallization of polymorphs by regulating the temperatures of the upper heat transfer means and the lower heat transfer means of the crystallizer (and, if necessary, the auxiliary heat transfer means) to different temperatures. In the case of such crystallization of polymorphs, for example, in the case of crystallization of glutamic acid, when operating with conditions under which the temperature difference between the upper heat transfer means J and the lower heat transfer means K is small (for example, setting the upper heat transfer means J (cooling jacket) to 16° C. and the lower heat transfer means (heating jacket) to 36.5° C. and maintaining the slurry temperature at 29.8° C.), the conditions are such that the slurry is cooled by the upper heat transfer means J, becomes oversaturated, and seeds of α-type crystals are easily generated. The seeds of α-type crystals generated under these conditions return to the mother liquor, and it seems that since the oversaturation is already somewhat reduced and the liquid is cooled again with the heating means J, the conditions are such that β-type crystals are not easily generated. Consequently, α-type crystals are crystallized selectively. It should be noted that even in cases in which no concentration is involved, crystallization methods and devices in which the temperature of the upper heat transfer means J of the crystallizer is lower than the temperature of the lower heat transfer means K are referred to as concentration crystallization and concentration crystallizers in this specification.

As in the first heat transfer device, the tank wall of the first crystallizer of the present invention may be provided with an inclination, preferably as shown in FIG. 6 and FIG. 7. If it is employed as a cooling crystallizer, then an upper heat transfer means K is provided whose temperature is higher than the slurry spouted on the tank wall provided with an inclination, so that the microcrystals in the slurry are reliably dissolved, and the heat transfer surface area is made even larger, so that the induction period for crystal generation is shortened, and crystals with a narrow size distribution and large size can be obtained.

If employed as a concentration crystallizer, then an upper heat transfer means K is provided whose temperature is lower than the slurry spouted on the tank wall provided with an inclination, so that the induction time for crystal generation is shortened, and crystals with a narrow size distribution and large size can be obtained.

Figure 12:
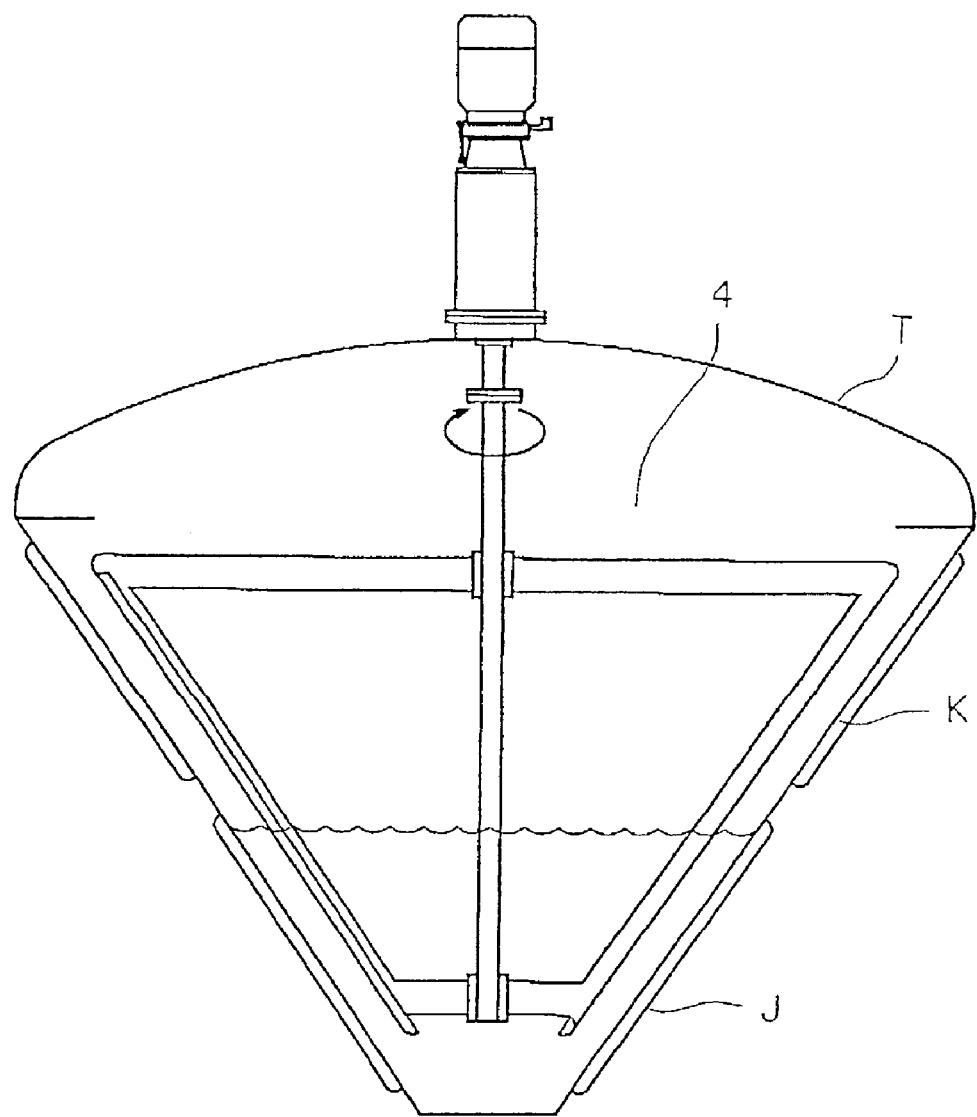
FIG. 12 shows an example of another crystallizer of the present invention.

For example, as shown in FIG. 12, a second crystallizer has an agitation tank T having an inclination, and a liquid circulation means 4 for circulating a liquid along an inclined tank wall of the agitation tank, and the agitation tank is provided with heat transfer means K and J with which a temperature difference can be created.

EXAMPLES

The following is an examination of the present invention by way of a working example. However, the present invention is not limited to this working example.

Figure 13:
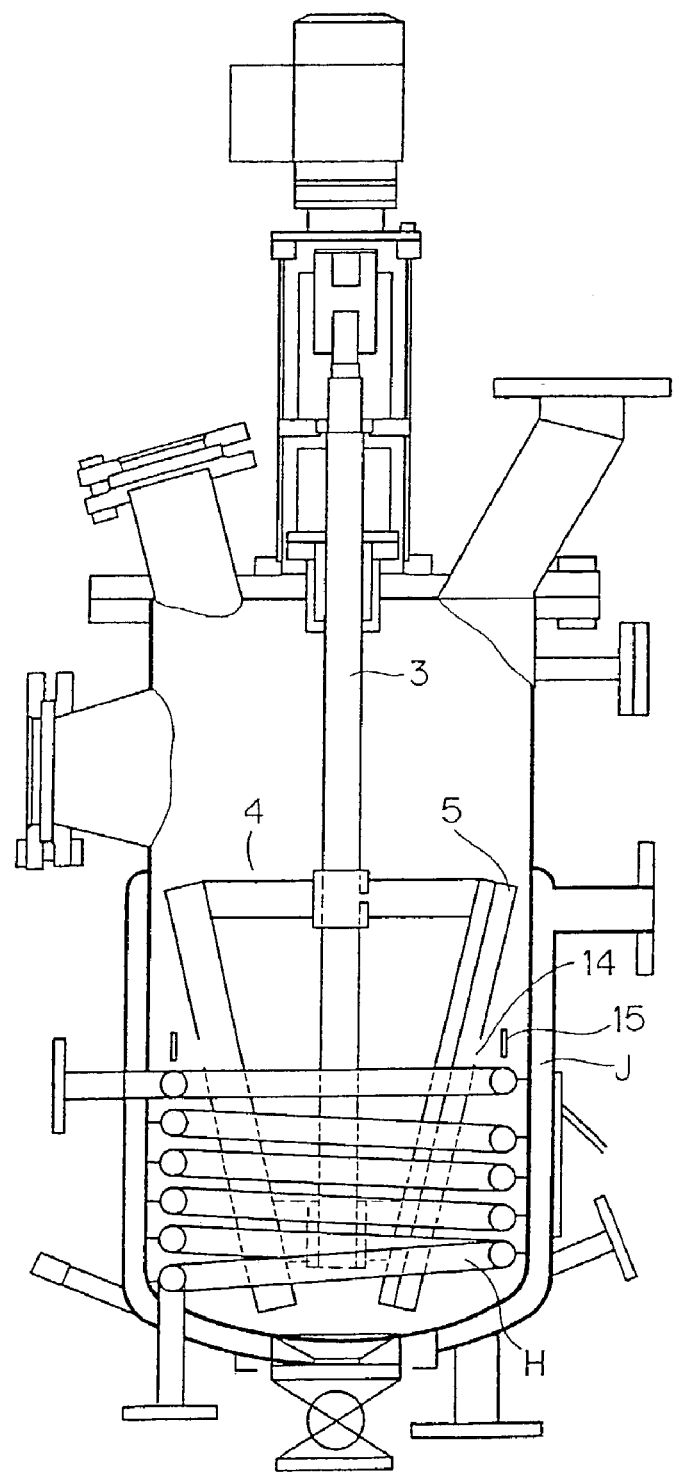
FIG. 13 shows an example of a heat transfer device of the present invention.

A heat transfer device (heat transfer device of the present invention) as shown in FIG. 13 was used. In this heat transfer device, a liquid spouting device 4 of gutter-shaped members 5 having holes 14 at intermediate portions was attached to a rotation shaft 3. A heat transfer jacket J is provided outside the heat transfer device, and a heat transfer coil H serving as an auxiliary heat transfer means is provided inside. A dispersion plate 15 is arranged above the heat transfer coil and is configured such that liquid that is spouted from the holes 14 provided at intermediate portions of the gutter-shaped members 5 of the liquid spouting device 4 drops onto this heat transfer coil H. This heat transfer device had a capacity of 100 L, the heat transfer surface area of the jacket portion was 0.758 m$^2$ and that of the coil portion was 0.472 m$^2$. The heat transfer surface area up to 15 L from the bottom portion was 0.308 m$^2$ for the jacket and 0.189 m$^2$ for the coil, and the capacity from the bottom portion to the coil was 3.7 L. For comparison, a similar device was used, in which a cone cave agitator was provided instead of the liquid spouting device (heat transfer device of the comparative example).

Figure 14:
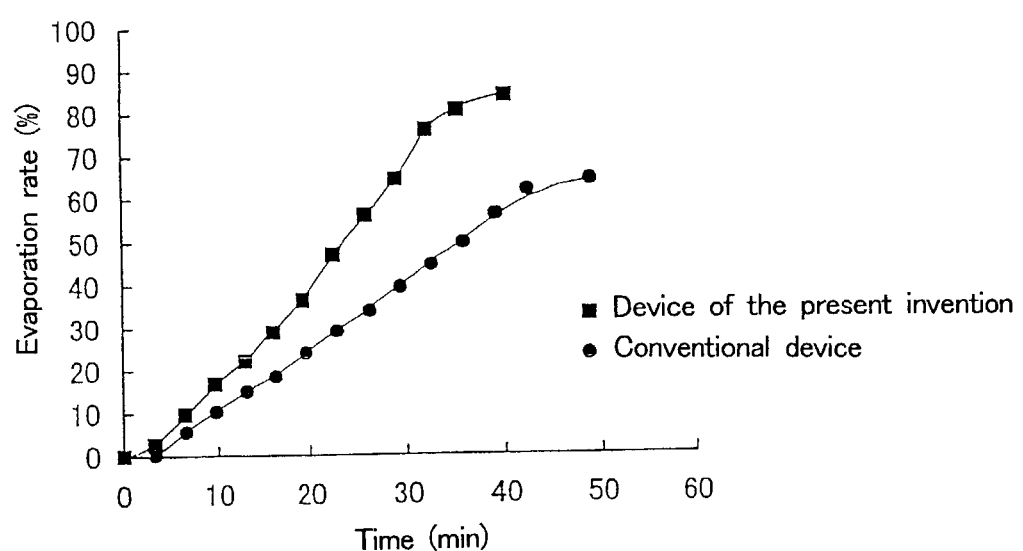
FIG. 14 is a graph illustrating the difference in evaporation rate between the heat transfer device of the present invention and a conventional heat transfer device.

Fifteen liters of methyl ethyl ketone were introduced into the heat transfer device of the present invention and the heat transfer device of the comparative example. Vapor was not supplied to the jacket portion J, but only to the coil portion H. The temperature difference between the heating portion and the liquid was 10° C. The results are shown in FIG. 14.

From these results, it could be confirmed that the heat transfer device of the present invention, in which the entire heat transfer surface area of the coil can be used, is more favorable than the heat transfer device of the comparative example, in which only a portion of the heat transfer surface area of the coils can be used for the heat transfer surface area. This indicates that heat transfer devices having an internal auxiliary heat transfer means whose entire heat transfer surface area of the auxiliary heat transfer means can be utilized, as in the heat transfer device of the present invention, have an excellent evaporation rate.

INDUSTRIAL APPLICABILITY

In the heat transfer device of the present invention, the tank wall and the auxiliary heat transfer means inside the tank are constantly wetted, so that if employed as a concentration device, scorching of the concentrate at the interface between a liquid and air and deposition and burning of adhering matter can be prevented. Consequently, it is not only possible to attain the effect that cleaning can be performed easily, but also, since the heat transfer surface area can be enlarged, the effect is displayed that the concentration rate can be increased even further.

The first heat transfer device of the present invention includes a liquid circulation means for circulating a liquid along a tank wall of the agitation tank and at least one auxiliary heat transfer means provided inside the agitation tank, wherein the entire agitation tank and the auxiliary heat transfer means are constantly put in a wetted state. Consequently, the entire heat transfer means forms a surface that is wetted by the liquid, so that the heat transfer efficiency is excellent. If the heat transfer means and the auxiliary heat transfer means are heating means, then the heat transfer device is a concentration device, and since the tank wall and the auxiliary heat transfer means in the tank are constantly wetted, scorching of the concentrate at the interface between a liquid and air as well as deposition and burning of adhering matter can be prevented. Consequently, it is not only possible to attain the effect that cleaning can be performed easily, but also, since the heat transfer surface area can be enlarged, the effect is displayed that the concentration rate can be increased even further.

Moreover, in the second heat transfer device, the tank wall of the device is provided with an inclination, so that the heat transfer surface area can be made large and the evaporation efficiency can be improved even further.

Furthermore, the first and the second heat transfer devices may also be employed as crystallizers. Such crystallizers are configured such that they have a temperature difference, so that the crystallization rate is increased and crystals with large size can be obtained easily.

What is claimed is:

1. A heat transfer device, comprising:
   an agitation tank;
   a liquid circulation means for circulating a liquid along a tank wall of the agitation tank; and at least one auxiliary heat transfer means provided inside the agitation tank;

wherein an outer surface of the auxiliary heat transfer means is constantly put in a wetted surface state; and wherein the liquid circulation means is a liquid spouting device made of a rotation shaft and one or more liquid feeding means that are mounted to the rotation shaft.

2. The heat transfer device of claim 1, wherein the auxiliary heat transfer means is a heat transfer coil; and wherein the liquid is scattered from a portion of the liquid spouting device to the heat transfer coil, so that an outer surface of the heat transfer coil becomes a wetted surface.

3. The heat transfer device of claim 1, wherein a dispersion plate is arranged above the heat transfer coil;

wherein the liquid is scattered from a portion of the liquid spouting device to this dispersion plate; and wherein the scattered liquid flows down from the dispersion plate, so that the outer surface of the heat transfer coil becomes a wetted surface.

4. The heat transfer device of claim 2, wherein the liquid spouting device has one or more holes midway in the liquid feeding means.

5. The heat transfer device of claim 1, wherein the liquid spouting device has a structure of a truncated cone having a double cylinder-shaped hollow portion;

wherein a heating medium is supplied to the hollow portion of the truncated cone;

wherein by rotation of the truncated cone, the liquid is lifted along an inner surface of the truncated cone;

wherein some or all of the lifted liquid drops along an outer surface of the truncated cone; and wherein the truncated cone has a constantly wetted surface.

6. The heat transfer device of claim 1, wherein the auxiliary heat transfer means is made of a first cylinder and a second cylinder arranged inwardly from the first cylinder and attached to a bottom portion of the heat transfer device;

wherein an upper surface of the first cylinder is arranged lower than an upper surface of the second cylinder;

wherein the liquid flows through the first cylinder to the second cylinder, and flows down from an upper portion of the second cylinder along a cylinder wall of the second cylinder.

7. The heat transfer device of claim 1, wherein the tank wall has an inclination.

8. A crystallizer, comprising:

an agitation tank;

a liquid circulation means for circulating a liquid or slurry along a tank wall of the agitation tank; and at least one auxiliary heat transfer means that is provided above a liquid surface inside the agitation tank, and that creates a temperature difference to the heat transfer means provided in the agitation tank;

wherein an outer surface of the auxiliary heat transfer means is constantly put in a wetted surface state.

9. The crystallizer of claim 8, wherein the auxiliary heat transfer means is arranged above the liquid surface inside the agitation tank.

10. The crystallizer of claim 8, wherein the tank wall of the agitation tank has an inclination.

11. A heat transfer device, comprising:

an agitation tank; and a liquid circulation means for circulating a liquid along a tank wall of the agitation tank;

wherein the tank wall of the agitation tank has an inclination; and wherein the liquid circulation means is a liquid spouting means made of a rotation shaft and one or more liquid feeding means that are mounted to the rotation shaft.

12. A crystallizer, comprising:

an agitation tank; and a liquid circulation means for circulating a liquid or slurry along a tank wall of the agitation tank;

wherein the tank wall of the agitation tank has an inclination; and wherein the agitation tank is provided with at least two heat transfer means, with which a temperature difference can be created.

13. The heat transfer device of claim 1, wherein the auxiliary heat transfer means is a heat transfer cylinder; and wherein the liquid is scattered from a portion of the liquid spouting device to the heat transfer cylinder, so that an outer surface of the heat transfer cylinder becomes a wetted surface.

14. The heat transfer device of claim 1, wherein a dispersion plate is arranged above the heat transfer cylinder;

wherein the liquid is scattered from a portion of the liquid spouting device to this dispersion plate; and wherein the scattered liquid flows down from the dispersion plate, so that the outer surface of the heat transfer cylinder becomes a wetted surface.

15. The heat transfer device of claim 2, wherein the liquid spouting device has two or more liquid feeding means of different length.

16. The heat transfer device of claim 3, wherein the liquid spouting device has one or more holes midway in the liquid feeding means.

17. The heat transfer device of claim 3, wherein the liquid spouting device has two or more liquid feeding means of different length.

18. The crystallizer of claim 9, wherein the tank wall of the agitation tank has an inclination.

19. The heat transfer device of claim 5, wherein a dispersion plate is provided at a portion above the truncated cone.

* * * * *